Figure 1:
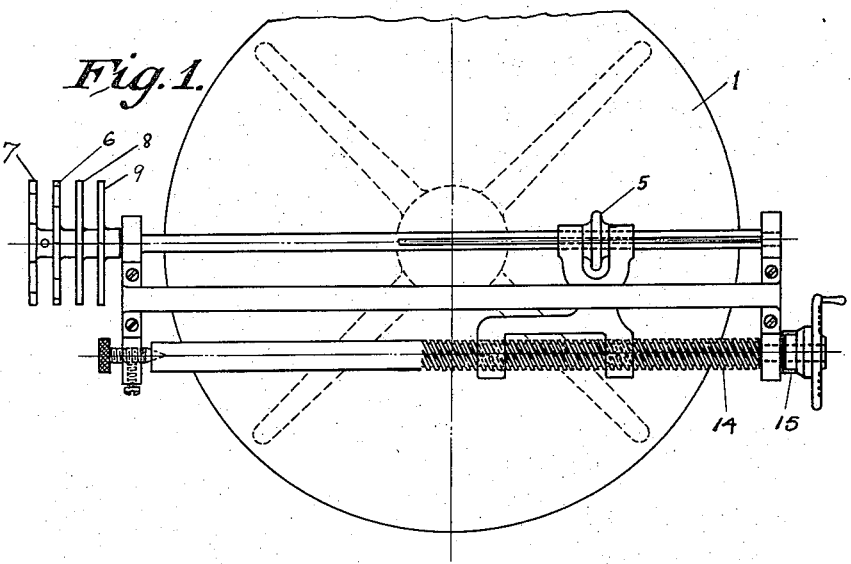

March 7, 1933.    H. C. HAYES    1,900,015
METHOD AND APPARATUS FOR SOUND RANGING
Filed Jan. 4, 1927    2 Sheets-Sheet 1

Inventor
Harvey C. Hayes
By Robert A. Lavender
Attorney

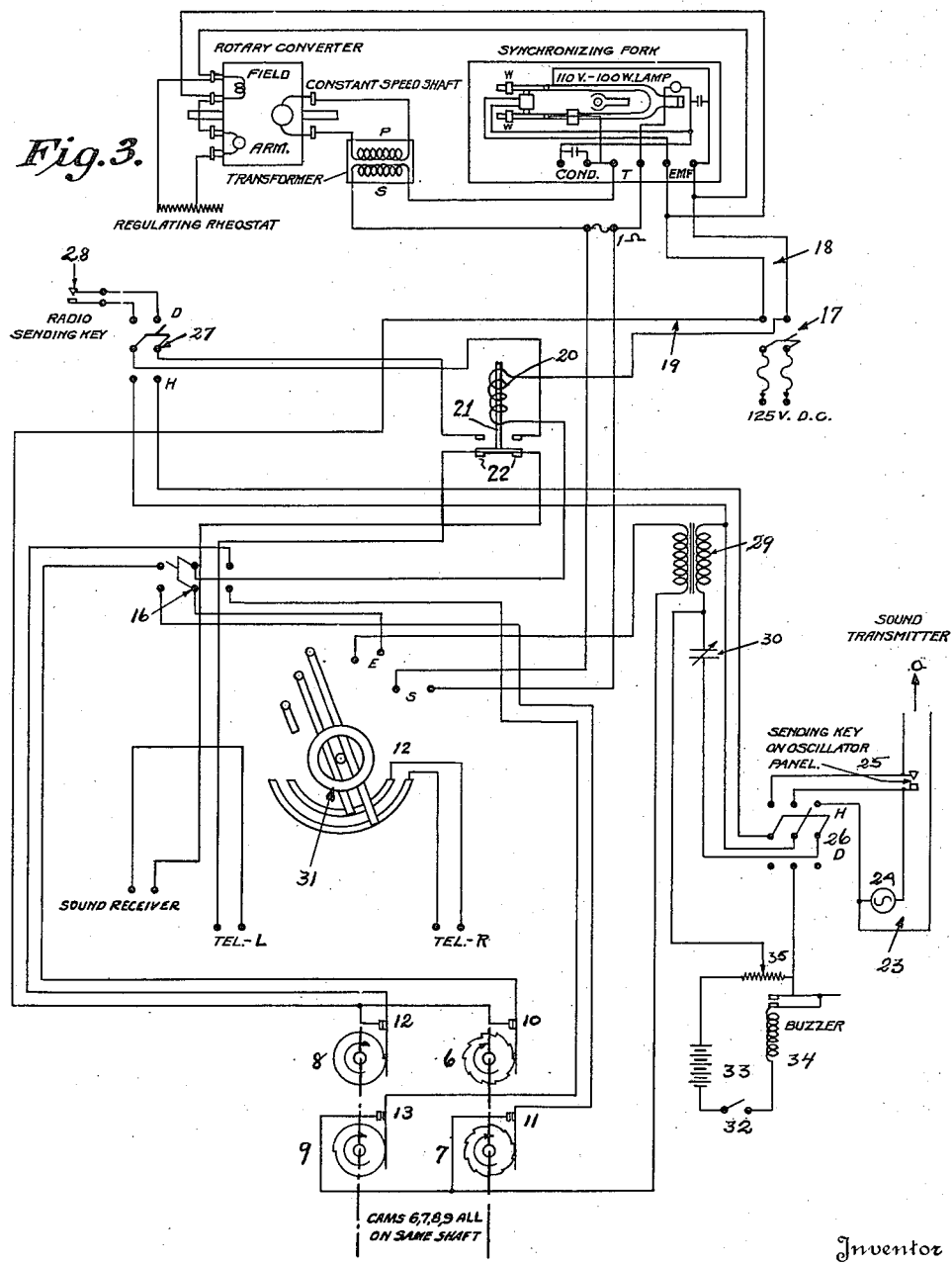

Patented Mar. 7, 1933

1,900,015

UNITED STATES PATENT OFFICE

HARVEY C. HAYES, OF WASHINGTON, DISTRICT OF COLUMBIA

METHOD AND APPARATUS FOR SOUND RANGING

Application filed January 4, 1927. Serial No. 158,953.

(GRANTED UNDER THE ACT OF MARCH 3, 1883, AS AMENDED APRIL 30, 1928; 370 O. G. 757)

My invention relates broadly to methods and apparatus for measuring distance and more particularly to sonic depth measuring apparatus.

The principal object of my invention is to produce a sonic depth finder method and apparatus which will operate with equal accuracy in shoal water or at great depths and in which, the direct and reflected signals will not coalesce to produce blurred signals and inaccurate results.

Another object of my invention is the production of an improved sound ranging method and apparatus which is universally applicable to all distances, shallow as well as deep water, and without any blind spot or distance and wherein the distance to be determined is measured as a function of the time required for sound to travel to the objective and for an echo to return therefrom which is compared with a time of occurrence of second sound signals or series of signals that are registered directly, the time interval between each signal of each series being uniformly constant relative to a given association of the two series and the time between the two series of signals being varied by varying the association of the two series proportionate to and indicative of the distance between the transmitter and the objective.

Further objects of my invention will appear more fully hereinafter.

My invention consists substantially in the method construction, combination, and arrangement of parts associated therewith or as will be more fully hereinafter set forth as shown by the accompanying drawings and finally pointed out in the appended claims.

Figure 2:
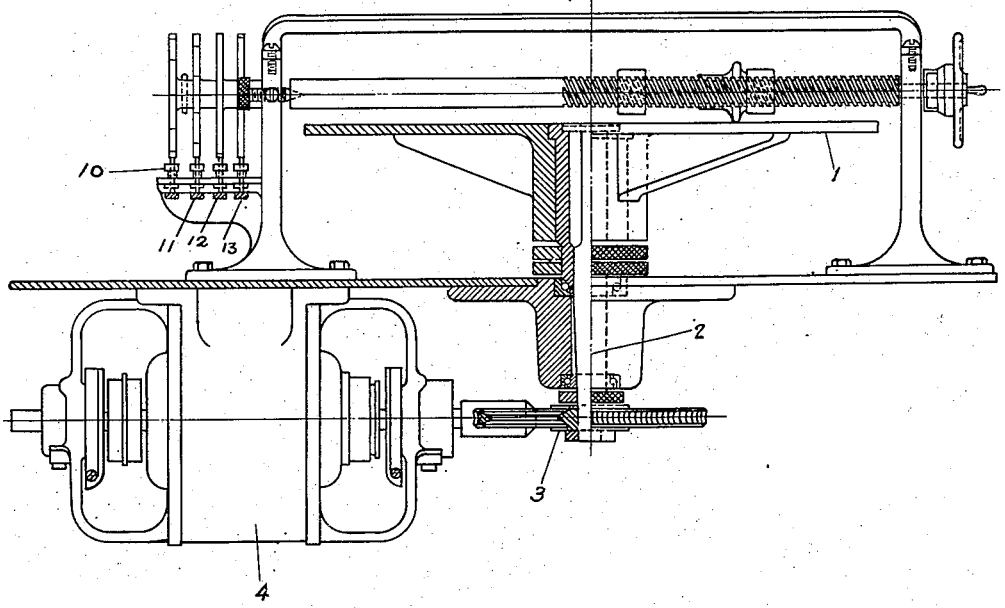

Reference is to be had to the accompanying drawings forming a part of this specification, in which like reference characters indicate corresponding parts throughout the several views and in which:

Figure 1 is a plan view of the apparatus,
Figure 2 is a sectional view of the same,
Figure 3 is a circuit diagram of the wiring system for the control of the apparatus.

Referring to Figures 1 and 2, numeral 1 represents a phonograph-like disc mounted on a vertical axis (2) that is driven at a constant speed through a worm-gear (3) by a speed controlled motor (4). Disc (1) drives a small wheel (5) through friction contact and thus rotates cam-wheels (6), (7), (8) and (9) that operate electrical contact points (10), (11), (12) and (13), to automatically open and close the sound transmitter circuit and the circuit in which are generated the local signals, these signals being produced at instants midway between the transmitted signals.

The friction wheel (5) is attached to its shaft by a slot and spline arrangement that permits it to slide along the shaft and at the same time links it with the shaft. The speed of rotation of the cam-wheels is varied from zero to a maximum by adjusting the position of wheel (5) along a radius of the disc by means of the micrometer screw (14). A scale (15) on the micrometer head gives the radius of the circle scribed on the disc (1) by friction wheel (5).

For this particular embodiment of my invention I have shown four cam wheels; two carry a single depression each, the two depressions being angularly displaced by 180 degrees; and two carry ten equally spaced depressions, these two cams being angularly displaced by 18 degrees.

The electrical circuits provided include a multiple double throw switch (16) for associating together the contacts of either the pair of one-toothed cams or the pair of ten-toothed cams and so arranged that both pairs can not be in operative arrangement at the same time. Of either pair of cams, one cam operates the contact points in the sound transmitter circuit and the other cam operates the contact points in the comparison signal circuit.

The use of cams having one and ten depressions permits a compact construction of the instrument by the use of small discs in the place of a large one that is necessarily involved should only one type of cam be used.

Figure 3 is a diagrammatic wiring diagram of the time measuring apparatus. Single throw switch (17) connects the 125 volt power circuit to the apparatus. One branch of this circuit (18) supplies power to the tuning-fork-speed-controlled rotary-converter that drives the four-cam-wheels through the friction drive mechanism described. This rotary converter, in its aspect as the driving means, acts as a D. C. motor. However, where it is required to drive from a D. C. source, the necessity for the employment of alternating current in this invention renders it desirable and convenient to use a rotary converter for such double purpose. Another branch (19) includes the coil of a double contact relay (20) and the contact points operated by cam-wheels (8) or (6), depending upon the position of switch (16). Cams (6) or (8) serve to open and close the circuit by means of contacts (10) or (12) respectively, thereby serving as an automatic sending key.

It will therefore be seen that each time these cams close circuit (19) the armature of relay (20) is attracted, closing contacts (21) of the sound transmitter circuit and opening contacts (22) of the sound receiver circuit. As soon as circuit (19) is broken, contacts (21) open and contacts (22) close.

The sound transmitter circuit (23) contains in series the alternating current generator (24), the sound transmitter or oscillator (O), (not shown), and the oscillator hand sending key (25). Contact points (21) are connected in parallel across the transmitting key by throwing the double throw switches (26) and (27) to the (H) position. Thus the cams (6) or (8), through the operation of contact points (21) by relay (20), serve as an automatic transmitting key paralleling the oscillator key (25).

This combination can also be made to parallel the radio transmitting key (28) by throwing switches (26) and (27) to the (D) position. This latter arrangement serves to determine the range between two separated stations or ships where the sound transmitter of the second station is operated by remote radio control.

In case of depth finding, where switch (26) is closed to the (H) position, the alternating current generator (24) is shunted by the primary coil transformer (29) and variable condenser (30) in series. The generator, therefore, continuously energizes this shunt circuit by a current depending for the most part upon the capacity of the condenser. It is not essential, however, that this circuit be tuned to resonance.

The circuit containing the secondary of transformer (29) includes, in series, the contact points (13) or (11) operated by cams (9) or (7), and one phone (Tel.-R) of a double phone head-set when the double-pole double-throw switch (31) is turned to the (E) position, as it must be when depths or ranges are to be measured.

When ranges requiring remote radio control are to be determined switch (26) is closed to the (D) position in which position the primary coil of transformer (29) is energized from a local buzzer circuit provided with battery (33) cut-out switch (32) and a buzzer (34), through a potentiometer coupling (35). But whether the primary of (29) is energized by the sound oscillator generator (O) or the buzzer (34), the secondary circuit, that energizes the telephone to give the local comparison signal, is closed only when contacts (13) or (11) are closed and this occurs midway between the closing of contacts (12) or (10) that operate the radio or sound transmitter.

For receiving a submarine sound signal or its echo a simple signal receiver device may be employed.

When the switch 31 is in the position S the telephone (Tel.-R) is in series with the synchronizing fork and the rotary converter. Should there be any departure from exact synchronism between the rotary converter and synchronizing fork it will be noticed by the production of beats in the telephone (Tel.-R). The speed of the rotary converter should be varied until there is no audible beat in the telephone. When this point is reached the rotary converter is in exact synchronism with the synchronizing fork and the apparatus is ready for the switch 31 to be placed in the (E) position for range finding.

The telephone (Tel.-L), energized by the submarine sound signals, has contact points (22) in series in its circuit. These points are open when points (21) are closed, that is, when the submarine sound signals are being transmitted, and for the extra time required for the relay armature to spring back. This latter instant is made equal to or slightly greater than the interval of direct sound transit from transmitter to receiver. The receiver of the submarine sound, therefore, is made inoperative to the direct signals but is free to receive their echoes at later instants. This, of course, could not be accomplished if the whole arrangement were not such as to make the echoes return midway or at some other definite point in the time interval between signals. In particular, it could not be employed if the adjustment of the period between signals were such as to make the echoes arrive coincident with the transmission of the signals.

A detailed description of the operation of the system shown in Fig. 3 is given in the following:

Switch 17 is first closed to provide a source of direct current for driving the rotary converter from its D. C. side. The speed of the rotary converter is next adjusted by the regulating rheostat until it runs at the proper speed, which speed is determined by adjusting the alternating current output frequency of the converter until it is equal to the frequency of a standard frequency synchronizing fork. This adjustment is made with the switch 31 in the S or synchronizing position. By listening to the beat frequency in the telephone, Tel.-R, the operator can determine by the absence of beats when the correct adjustment is obtained. When this adjustment is obtained and it is known that the rotary converter shaft is driving the camwheels 6, 7, 8 and 9 at the proper speed the switch 31 is moved to the range finding or E position. Switches 26 and 27 are next closed to the sound transmitting or H position. If the depths or distances to be measured are great, the switch 16 is thrown to the right; if they are small, the switch 16 is thrown to the left. With the switch in the right-hand position, sound signals are transmitted once each revolution of the cam wheel 8. With the switch in the left-hand position, sound signals are transmitted ten times during each revolution of the cam wheel 6. Assuming the switch 16 to be to the right, signals are transmitted by way of the following circuits: Cam 8 closes the circuit of relay 20 through switch 16 and contacts 12, relay 20 energizes and through contacts 21, switch 27 and switch 26, it connects the alternating current generator 24 to the sound transmitter whereby a sound signal is transmitted. Cams 8 and 9 continue rotating together and after reaching a certain predetermined point cam 8 opens contacts 12 permitting relay 20 to deenergize and open the transmitter circuit, stopping the transmission of sound signals. After the cams 8 and 9 have rotated through an additional angle cam 9 closes contacts 13 and connects the telephone, Tel.-R, in circuit with the secondary of transformer 29 through switches 16 and 31 whereby an audible note is heard in the telephone, Tel.-R, it being understood that the transformer 29 is continuously energized from alternating current generator 24 through switch 26 and condenser 30.

Relay 20 on deenergizing responsive to the opening of contacts 12 closes its back contacts 22 and completes a circuit for the sound receiver associated with the telephone, Tel.-L. When the echo corresponding to the transmitted signal is received by the sound receiver and conveyed to the telephone Tel.-L, an audible signal is heard. By varying the speed of rotation of the cams 8 and 9, it is possible to make the time of reception of the echo signal at the telephone Tel.-L simultaneous with the reception of a signal at the telephone Tel.-R. This adjustment is made by the operator who then determines the depth or distance of the object from the formula, $$H = \frac{V}{4}(2n-1) \cdot p$$

where H is the depth, V is the velocity of sound in the medium through which it passes (sea water), n is the number of signals in transit; that is, the number of signals transmitted before any echoes are received back and p is the time interval between signals. It is only necessary to count the number of signals transmitted before echoes are received and to determine the length of the period between impulses to accurately fix the distance.

In the above example the cams 8 and 9 controlled contacts 12 and 13; however, with shorter ranges or depths to be measured, it is preferable to move the switch 16 to the left, in which case cams 6 and 7 perform the same functions as cams 8 and 9, but signals are transmitted at a higher rate.

In the above description of the operation of the system, sound signals were transmitted from the sound transmitter or oscillator O aboard the depth or distance measuring vessel. However, it is to be understood that the sound transmitter or oscillator O could be on another vessel or station at a distance from the sound receiver, in which case the signals emitted therefrom would be controlled via a radio channel (not shown) the keying circuit of which is controlled by the contacts 21 of relay 20 or by key 28 with the switch 27 in the D position, it being understood that the key 28 is bridged across the control circuit of a radio transmitter (not shown).

A cycle of operation of the apparatus when used to determine the range between two separated stations or ships where the sound transmitter at a remote station is operated by remote radio control from a first station is as follows: The apparatus is started and adjusted as outlined above in connection with the sending of sound signals from a local sound transmitter. Switches 26 and 27 are closed to the D position, switch 31 is closed to the E position, buzzer switch 32 is closed and switch 16 is closed to either position. Assuming switch 16 to be closed to the left, cam 7 closes a circuit at contact 11 to apply a buzzer tone to the telephone Tel.-R via the secondary of transformer 29, contact 11, switch 16 and switch 31. As the cams rotate, contact 11 is opened and contact 10 is closed by cam 6 to initiate the sending of a sound signal from a sound transmitter at a distant station in the following manner: Closure of contact 10 closes the circuit of relay 20 via switch 16 and conductors 19 to the source of potential connected to switch 17. Relay 20 energizes and closes the keying circuit of the radio transmitter (not shown) via contacts 21 and switch 27 in the D position causing radio waves to be transmitted to the remote station where the waves are received by an appropriate receiver and made to actuate a key in a sound transmitter circuit similar to the sound transmitter circuit shown at O in Fig. 3. The sound waves generated at the remote station travel across the distance to be measured to the sound receiver at the first station which is connected by means of the back contact 2 of relay 20 to the telephone Tel.-L.

This cycle of operations is repeated. First a sound signal is initiated in Tel.-R by means of the buzzer 34, transformer 29, etc. Then a sound signal is initiated from the remote station, and then in Tel.-R. By varying the speed of rotation of the cams 6, 7 it is possible to make the time of reception of the signals at Tel.-R and Tel.-L simultaneous. This adjustment is made by the operator who then determines the distance of the remote station by the formula $$D = \frac{V}{2}(2n-1) \cdot p.$$

Where D is the distance to the remote station, V is the velocity of sound in the medium between the stations, $n$ is the number of signals in transit, and $p$ is the time interval between signals. In the above solution the time of transit of the radio signals between stations has been neglected inasmuch as the error introduced thereby is practically negligible.

From the above it may be seen that the only difference in the operation of the system when used for depth determinations by means of echoes and when used for distance determinations between two stations, is the fact that in one case the sound signals are emitted locally and go to and return from the object whose distance is to be measured, and in the other case the sound signals are emitted from a different station via radio control from the first station and traverse the distance to be measured only once before being received.

It will be understood that the above description and accompanying drawings comprehend only the general and preferred embodiment of my invention and that minor detail changes in construction and arrangement of parts may be made within the scope of the appended claims and without sacrificing any of the advantages of my invention.

The invention herein described may be manufactured and used by or for the Government of the United States for governmental purposes without the payment to me of any royalty thereon or therefor.

What I claim is as follows:

1. In a device for measuring distance consisting of means for generating one periodic series of sonic signals, means for generating a second periodic series of sonic signals so spaced in time relation to the first series that the signals of the second series are generated only midway between the signals of the first series, means for projecting said first series of signals to an object, the distance of which it is desired to know, means for receiving the sonic signals reflected from said object and conveying them to a point of audition, means for conveying the second series to the point of audition and means for correspondingly varying the period of the two series of signals and maintaining said midway relation whereby the echoes of the signals of the first series reach said point of audition at the same time as the direct signals of the second series.

2. In a device for measuring distance consisting of means for generating one periodic series of sonic signals, means for generating a second periodic series of sonic signals so spaced in time relation to the first series that the signals of the second series are generated only in the periods between the signals of the first series and in which said periods are divided by signals of the second series in a fixed ratio at all times independent of the frequency of occurrence of said signals, means for transmitting said first series of signals to an object, the distance of which it is desired to know, means for receiving the sonic signals reflected from said object and conveying them to a point of audition, means for conveying the second series to the point of audition and means for correspondingly varying the frequency of occurrence of the two series of signals and maintaining said time relation whereby the echoes of the signals of the first series reach said point of audition at the same time as the direct signals of the second series.

3. In a device for measuring distance consisting of means for generating one periodic series of sonic signals, means for generating a second periodic series of sonic signals so spaced in time relation to the first series that the signals of the second series are generated only between the signals of the first series, means for transmitting said first series of signals to an object, the distance of which is desired to be known, means for receiving and conveying to a point of audition the sonic signals reflected from said object, means for disabling said receiving means while said first series of signals are being transmitted, means for correspondingly varying the period of the two series of signals and maintaining said midway relation whereby the echoes of the signals of the first series reach said point of audition at the same time as the direct signals of the second series.

4. The method of sound ranging at varying depths and distances wherein the distance to be determined is a function of the time required for a sonic signal to travel from a source to an objective and for an echo to return, consisting of generating two series of sonic signals definitely interspersed in time with respect to one another, transmitting one of said series of signals to said objective, receiving the echo therefrom and conveying it to a point of audition only when signals are not being transmitted, conveying said other series of signals to a point of audition and varying the frequency of occurrence of both said series of signals while maintaining said interspersed relation until the echoes of said transmitted signal arrive at said point of audition simultaneously with said other series of signals.

5. The method of sound ranging wherein the distance to be determined is a function of the time required for sound to travel from a source to an objective and for an echo to return, consisting of generating a periodic series of sound signals, generating a second periodic series of sound signals so spaced in time relation to the first series that the signals of the second series are generated only between the signals of the first series, directing the transmission of the signals of the first series from the generating point to an objective from which they are returned as echoes, receiving said echoes and conveying them to a point of audition, conveying said second series of signals to said point of audition, and correspondingly varying the period of the two series of signals while maintaining said time relation until the echo signals of the first series reach said point of audition simultaneously with said other series of signals, whereby the distance of said objective may be determined from the number of said second series of signals received prior to the reception of the first echo signal and the frequency of occurrence of said signals.

6. In a device for measuring the distance between a first and a second separated station, means located at said first station for generating a periodic series of sonic signals, means located at said second station for generating a second periodic series of sonic signals so spaced in time relation to the first series that the individual signals of the second series are generated only between the individual signals of the first series, means for correspondingly varying the period of the two series of signals while maintaining the interspersed relation whereby individual signals transmitted from said second station reach said first station at the same time as other individual signals are being generated at said first station by said first named means.

7. The method of sound ranging between a first and second station wherein the distance to be determined is a function of the time required for sound to travel from a source at said second station to said first station, consisting of generating a periodic series of sound signals at said first station, generating a second periodic series of sound signals at said second station, so spaced in time relation to the first series that the signals of the second series are generated only between the signals of the first series, and correspondingly varying the period of the two series of signals while maintaining said time relation until the individual signals transmitted from said second station reach said first station at the same time as other individual signals are being generated at said first station.

HARVEY C. HAYES.